United States Patent [19]

Stauffer

[11] 4,080,531

[45] Mar. 21, 1978

[54] SINGLE PASS DISTANCE DETERMINING AND AUTOMATIC FOCUSING APPARATUS WITH SEPARATELY ADJUSTED OPTICAL ELEMENT

[75] Inventor: Norman L. Stauffer, Englewood, Colo.

[73] Assignee: Honeywell Inc., Minneapolis, Minn.

[21] Appl. No.: 700,829

[22] Filed: Jun. 29, 1976

[51] Int. Cl.² .............................................. G01J 1/36
[52] U.S. Cl. .................... 250/204; 250/201; 354/25
[58] Field of Search ................ 250/201, 204; 354/25; 356/1, 4, 5

[56] References Cited

U.S. PATENT DOCUMENTS

| 3,450,883 | 6/1969 | Thomas | 250/204 |
| 3,759,614 | 9/1973 | Harvey | 356/4 |
| 3,898,676 | 8/1975 | Hosoe et al. | 354/25 |
| 4,002,899 | 1/1977 | Stauffer | 250/201 |

FOREIGN PATENT DOCUMENTS

| 2,408,746 | 2/1973 | Germany | 354/25 |

*Primary Examiner*—David C. Nelms
*Assistant Examiner*—Vincent J. Sunderdick
*Attorney, Agent, or Firm*—H. L. Hanson; C. J. Ungemach

[57] ABSTRACT

An adjustable camera lens forms an image of an object on an image plane. First and second mirrors produce respective first and second detection images of the object on respective first and second arrays of light sensors. These arrays form portions of an integrated circuit chip. Upon each actuation of the apparatus to provide a focusing adjustment of the lens, a single pass scanning mechanism moves one of the mirrors, independently of the lens, completely through its full range of movement in a single scanning pass, and then arrests this scanning movement of the mirror until the apparatus is subsequently actuated again to initiate a subsequent scanning and focusing operation. The scanning movement of the mirror moves the corresponding image on the corresponding array. A signal processing circuit receives the outputs of the light sensors and produces an output signal which experiences a peak at that position of the moved mirror which causes the light distributions of the images to be in best correspondence on the arrays. This mirror position is the correlation position and represents the existing object distance. A circuit which receives the output signal produces a mirror position signal which represents the mirror correlation position at which the output signal peak occurs. A comparator compares the mirror position signal with a signal representing the lens position and allows a spring to move the lens independently of the mirror until the lens position signal corresponds to the mirror position signal. At that time, the lens movement is arrested, leaving the lens in a focus position which corresponds to the mirror correlation position and to the existing object distance, and at which the image of the object is in focus on the image plane.

15 Claims, 3 Drawing Figures

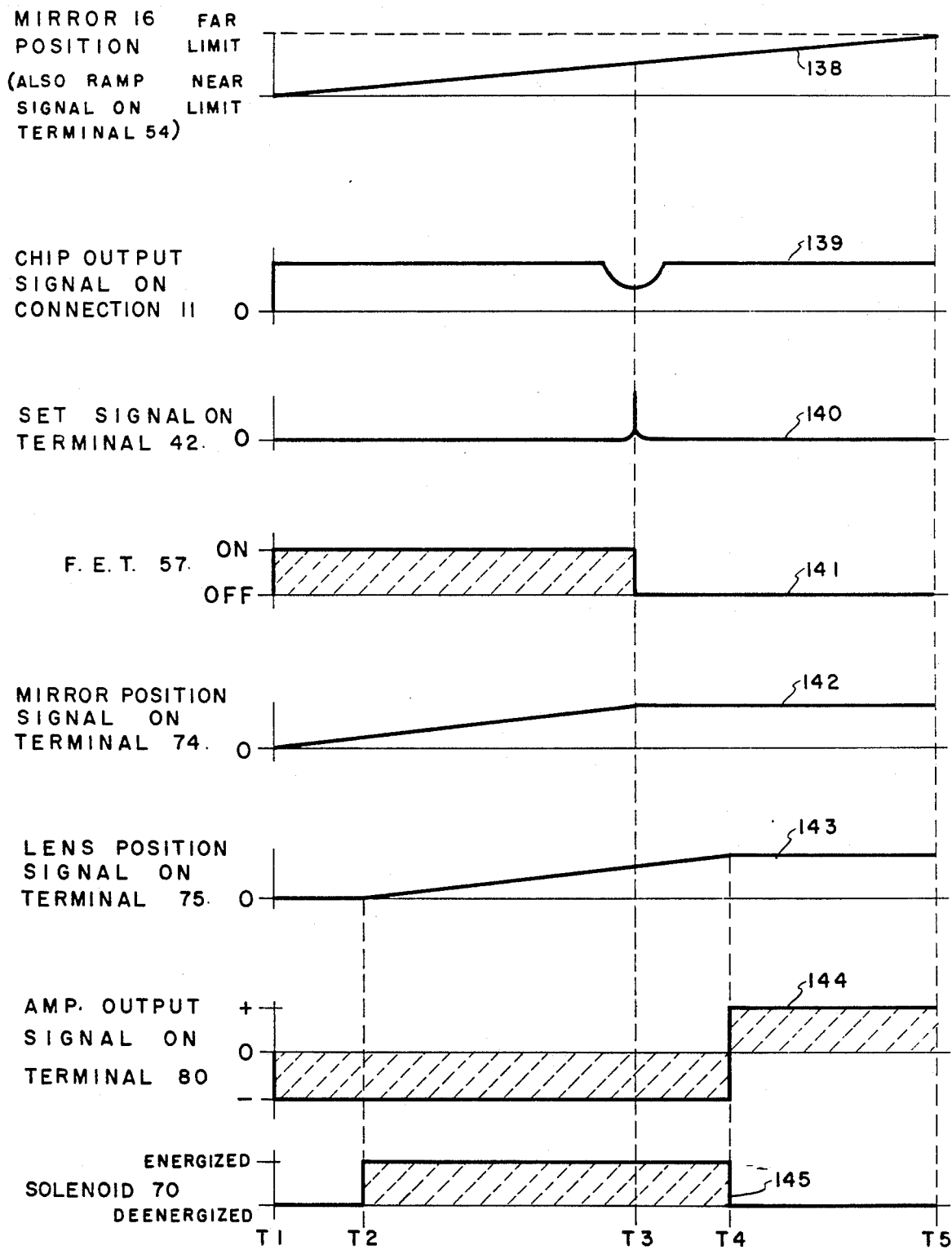
FIG. 3  TIME IN SCANNING PERIOD

SINGLE PASS DISTANCE DETERMINING AND AUTOMATIC FOCUSING APPARATUS WITH SEPARATELY ADJUSTED OPTICAL ELEMENT

CROSS-REFERENCES TO RELATED APPLICATIONS

Subject matter disclosed but not claimed herein is disclosed and claimed in the following copending Stauffer U.S. patent applications:

(1) Ser. No. 627,607, filed Oct. 31, 1975, now U.S. Pat. No. 4,002,899, issued Jan. 11, 1977; and (2) Ser. No. 596,059, filed July 15, 1975, now U.S. Pat. No. 3,958,117, issued May 18, 1976.

FIELD OF THE INVENTION

The present invention relates generally to apparatus for automatically providing a measure of the distance between the apparatus and an object. Specifically, the invention relates to the so-called spatial image correlation type or form of such apparatus, wherein the object distance is determined by relatively moving auxiliary image-producing auxiliary optical means and radiation responsive arrays to cause them to occupy a detectable correlation position, this position being a measure of the existing object distance. The invention relates as well to so-called automatic focusing apparatus which utilizes such a distance measure for automatically placing an optical element, such as a camera taking lens, in a focused condition relative to the object for the prevailing object distance.

DESCRIPTION OF THE PRIOR ART

Distance determining and automatic focusing arrangements of the spatial image correlation type noted above have been proposed in the past. In each of these known arrangements, the auxiliary optical means form a respective auxiliary, or detection, image of the object on each of two radiation responsive, or detector, arrays. The positions and radiation distributions of these auxiliary images on their corresponding arrays vary in a known manner with changes in the object distance, and with changes in the relative positions of the auxiliary optical means and the corresponding arrays.

Each of the said radiation responsive arrays is made up of a plurality of radiation responsive elements, and each of these elements in one of the arrays has a positional counterpart in the other of the arrays. Further, each of these elements provides an electrical signal which is representative of the intensity of the radiation impinging on that element. These signals are processed to produce an output signal which exhibits a peak or excursion in the form of a dip to a minimum value whenever the radiation distributions of the two auxiliary images on their corresponding arrays are substantially identical or in a condition of so-called best correspondence.

In each distance measuring or focusing operation in the known arrangements being described, at least one of the auxiliary images and its corresponding array are relatively moved to change the radiation distributions on the arrays. For convenience, this relative movement is generally achieved by moving or positioning a portion or member of the auxiliary optical means, such as an auxiliary lens or mirror, relative to the corresponding one of the arrays. To simplify the present description, such a member will be referred to hereinafter simply as the moved member.

At a certain position of the moved member which is determined by the then-existing object distance, the radiation distributions on the two arrays arrive at said condition of best correspondence, and the output signal experiences the above-noted dip. This position of the moved member is thus unique to, and identifies, the particular object distance then existent, and hence is a measure of that particular distance. For convenience, this particular position of the moved member is referred to as the correlation position for that particular distance, and the output signal dip which identifies this position is referred to as a correlation dip. Thus, there is a specific, unique correlation position of the moved member, identified by the occurrence of a correlation dip, for each object distance encountered by the apparatus within its operating range.

The known arrangements ascertain or detect said correlation positions of the moved member in order to provide a measure of the object distance. Specifically, said arrangements provide such a measure by detecting each occurrence of an output signal dip, and by ascertaining and providing a measure of the particular position which the moved member occupies at the time, in each distance determining operation, at which an output signal dip is produced and detected.

When the automatic focusing of a primary optical means, such as a camera taking lens, is effected by the apparatus just described, this apparatus includes means to move the primary optical means so that its position corresponds to the currently detected correlation position of the moved member. The construction of this apparatus is such that, when the position of the primary optical means corresponds to the current correlation position of the moved member, the primary image of the object produced by the primary optical means is in best focus on a predetermined image plane.

Examples of different forms of arrangements of the type described above are found in the above-listed copending Stauffer applications, in the Stauffer U.S. Pat. Nos. 3,836,772 and 3,838,275, and in the U.S. Biedermann et al Pat. No. 3,274,914. In the Stauffer arrangements of the noted patents and application (1), the moved member is an auxiliary lens or mirror. This member, and a primary lens coupled thereto, are moved together, each time that the object distance changes, from a former correlation and focus position for the old object distance to a new correlation and focus position for the new object distance.

In the arrangements of the noted Stauffer application (2), the moved member is an auxiliary lens or mirror which is continuously reciprocated so that it is moved, swept, or scanned through its range of positions during each of continuously repeated time periods. The correlation position for the existing object distance is ascertained in each such sweep, and a primary lens is separately moved to the position corresponding to the last-determined correlation position. The construction of this apparatus is again such that the adjusted position of the primary lens which corresponds to the current correlation position of the continuously scanning auxiliary lens or mirror causes the primary image to be in best focus.

In the Biedermann et al form of apparatus, the moved member and a mechanically coupled primary lens are moved together, each time that a focusing operation is initiated, from a datum position (the infinity focus position of the lens) to the position in which correlation is achieved for the existing object distance. Subsequently, the moved member and the primary lens are moved together back to the datum position, ready for the next focusing operation.

The known apparatus, exemplified by the arrangements of the noted Biedermann et al and Stauffer patents and Stauffer applications, doubtless has practical utility for certain applications. All of these arrangements, nevertheless, are characterized by at least one significant shortcoming. Specifically, the constructions of the Biedermann et al and Stauffer patents and the Stauffer application (1) require that the primary lens be mechanically coupled to, and moved along with, the moved member. Such mechanical coupling of those elements results in several disadvantageous limitations, as will now be explained.

First, the mechanical coupling of the primary lens to the moved member places a serious limitation on the speed with which the moved member can be moved or scanned through its range of positions while seeking a correlation position. This is so because of the inherently greater mass of the primary lens relative to the mass of the moved member. This limitation is particularly significant and undesirable in those applications in which the moved member should be moved very rapidly in order to avoid the undesirable effects of subject and/or apparatus motion. A hand-held camera is a typical application wherein the speed of the moved member should be very high, and should not be in any way restricted or limited by the attachment of the taking lens to the moved member.

A second disadvantage of the requirement that the primary lens and the moved member be mechanically coupled is the limitation which this construction imposes on the structured design of the apparatus. Such coupling introduces significant problems if it is attempted to place the moved member and related portions of the automatic focusing structure at positions other than adjacent the primary lens. Consequently, this requirement limits design freedom.

A third disadvantage of the requirement for moving the primary lens and the moved member together as a unit is that this construction makes it difficult to employ interchangeable primary lenses. The required mechanical linkage between the moved member and the primary lens must be tailored to the characteristics of these two elements so that they will track properly, and the substitution of a different primary lens requiring a different tracking relationship with the moved member undesirably requires that the mechanical linkage be suitably modified.

Although the above-noted shortcoming does not apply to the noted Stauffer application (2), the latter does have the disadvantage of being relatively complex. This complexity results from the need for this apparatus to provide the continuous scanning action required for motion picture cameras and the like, and becomes a significant disadvantage in those applications where such continuous operation is not required, as in the case of a relatively inexpensive still camera.

SUMMARY OF THE INVENTION

Accordingly, it is an object of the present invention to provide improved spatial image correlation type distance measuring and automatic focusing apparatus which is not subject to the noted shortcomings of the previously known apparatus, and which thus embodies a relatively simple construction which, nevertheless, allows the moved member to move rapidly through its range of scanning movement in each separate scanning period without the hinderance of an attached or coupled primary lens or other element. More specifically, it is an object of the invention to provide such improved apparatus which, on demand, provides an individual focusing operation and scanning period in which the speed of the moved member is not in any way limited by the presence of the primary lens or any other member. A further specific object of the invention is to provide such improved apparatus wherein there are no limitations imposed as to the relative locations of the moved member and a primary lens, and wherein the use of interchangeable primary lenses is facilitated.

In accordance with the present invention, the foregoing and other desirable objects are accomplished by the inclusion in said improved apparatus of an adjustable or positionable element or device, such as a primary lens, which is independently movable with respect to the moved member of the apparatus, and by the inclusion of novel, relatively simple, single pass scanning means for the moved member. The latter may be a mirror or other movable auxiliary optical means or member, and will, for simplicity, be referred to hereinafter simply as a mirror. The said adjustable element will, for simplicity, be referred to hereinafter simply as a lens.

The novel single pass scanning means of the improved apparatus is constructed to move the mirror, independently of the lens, through its full or complete range of positions in a single scanning pass only once each time that the apparatus is actuated to provide a focusing operation. The scanning means then arrests the scanning movement of the mirror until the apparatus is subsequently actuated again to initiate a subsequent focusing operation. This is in contradistinction to the complex continuous scanning means of the apparatus of the noted Stauffer application (2), and to the apparatus of the noted Biedermann et al patent wherein the moved mirror is stopped within its range of movement when the mechanically coupled lens is stopped.

The improved apparatus also includes a responsive portion which includes a peak detector and which produces an effect, such as a mirror position signal value, which represents or identifies the correlation position of the mirror and hence the existing object distance. This effect also represents the position to which the lens is to be moved to provide a focused image of the object for the existing object distance. Finally, the improved apparatus includes control means which respond to the noted effect and which place the lens in the position dictated by the effect. Such positioning of the lens is effected without the need or presence of any mechanical connection between the lens and the mirror.

BRIEF DESCRIPTION OF THE DRAWINGS

A better understanding of the present invention may be had from the following detailed description when read in connection with the accompanying drawings, wherein:

FIG. 3 is an operational curve diagram illustrating the operation of the FIG. 1 apparatus for a typical situation.

DETAILED DESCRIPTION OF THE PREFERRED EMBODIMENT

Figure 1:
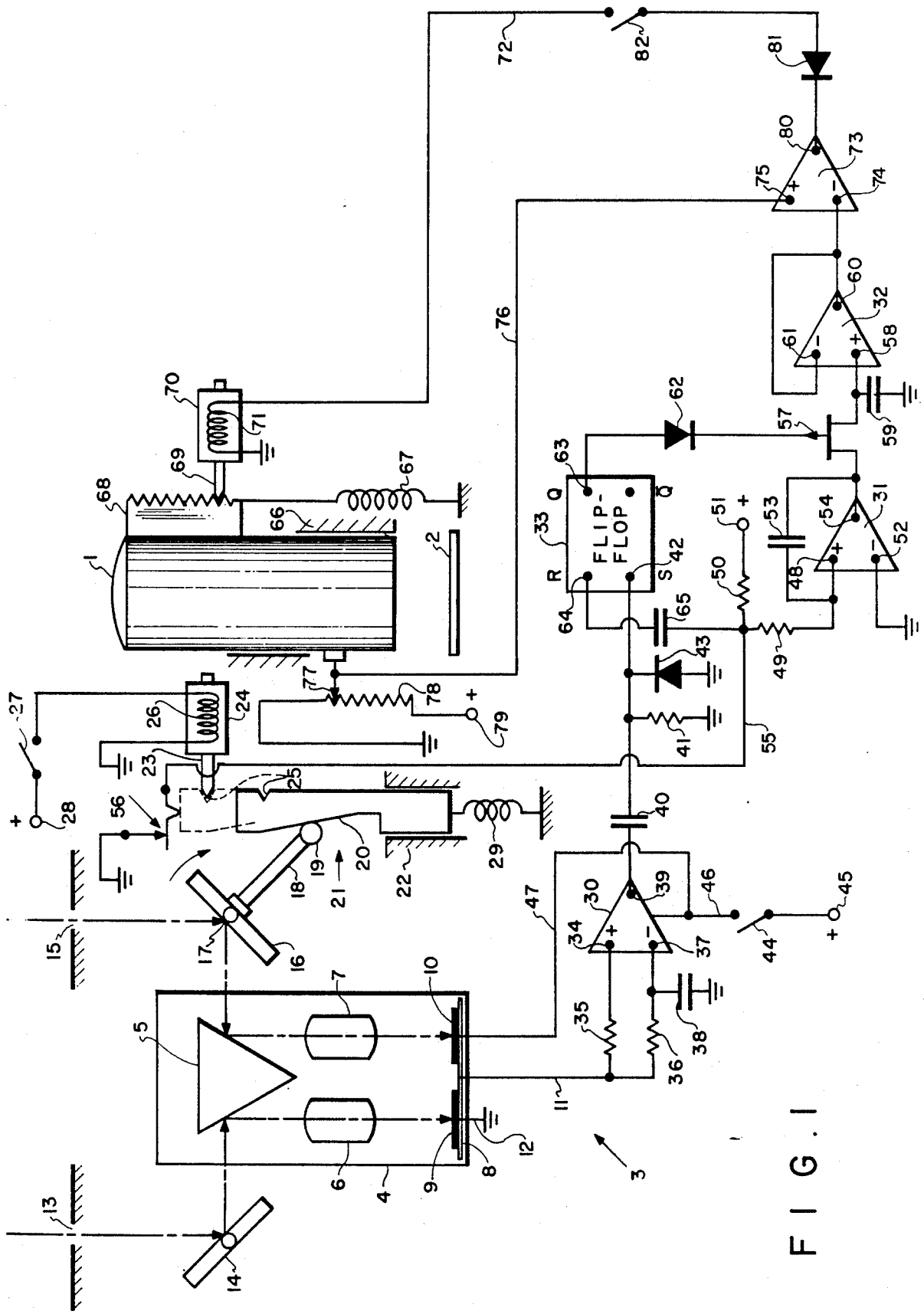
FIG. 1 is a diagrammatic representation of spatial image correlation automatic focusing apparatus embodying the present invention.

The Apparatus of FIG. 1

The apparatus shown in FIG. 1, and illustrating a preferred example of the above-noted improved apparatus embodying the present invention, is single pass automatic focusing apparatus, which, on demand, initiates a single scanning period and a single focusing operation in which the apparatus determines, and provides a measure of, the distance from the apparatus to a selected object. This distance is referred to hereinafter as the object distance. The apparatus then moves a primary lens 1 to a position which corresponds to the measure of the object distance which has been provided, in which position the lens 1 produces a focused image of the object on an image plane 2.

For illustrative purposes, it is assumed herein that the lens 1 is the taking lens of a photographic camera, and that the FIG. 1 apparatus is embodied in the camera to automate the camera focusing operation. The plane 2 then represents the film plane of the camera. The shutter and other known portions which such a camera would include have been omitted from the FIG. 1 showing in order to avoid unduly complicating the figure, the illustration of such portions not being necessary to an understanding of the present invention or its embodiment.

Figure 2:
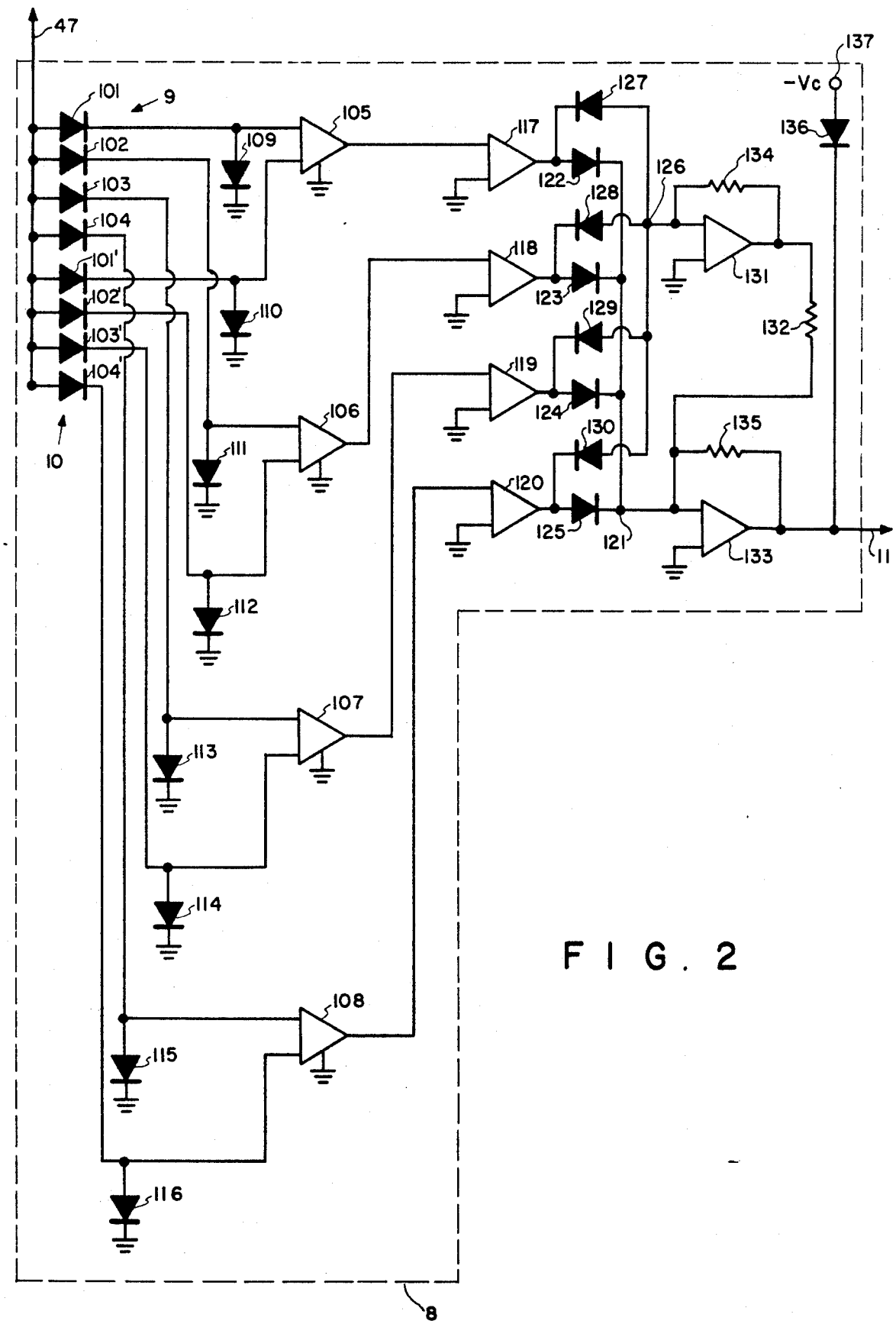
FIG. 2 is a schematic circuit diagram of one form which the circuit of the integrated circuit chip of the FIG. 1 apparatus may take.

The FIG. 1 apparatus includes an image correlation portion 3 of the type disclosed in the noted Stauffer applications. This portion includes a module 4 containing a reflecting prism or mirror 5, a lens 6, a lens 7, and an integrated circuit chip 8. The latter includes, as portions thereof, a plurality of radiation or light responsive elements which are arranged in first and second detector arrays 9 and 10, respectively. Such elements are shown in FIG. 2, to be described hereinafter. The chip 8 is also considered to include, as portions thereof, signal processing circuitry connected to the elements of the arrays 9 and 10 and operative to process the output signals of said elements to form a processed or chip output signal. An example of this circuitry is also shown in FIG. 2. The chip output signal is produced between a chip output connection 11 and a chip output connection 12. The latter is connected to ground or circuit common.

The portion 3 also includes an aperture 13 and an auxiliary mirror 14 which cooperate with the prism 5 and the lens 5 to form a first auxiliary or detection image of the object on the detector array 9. Similarly, the portion 3 also includes an aperture 15 and a movable or scanning auxiliary mirror 16 which cooperate with the prism 5 and the lens 7 to form a second auxiliary or detection image of the object on the detector array 10. The mirror 16 is pivoted at 17.

The dash-dot lines of FIG. 1 are provided merely to show the general paths over which the radiation or light from the object would pass in forming the detection images on the respective arrays 9 and 10. Accordingly, these lines are not intended to show the specific light paths or image positions which would result from the specific element positions shown by way of example in FIG. 1.

As in the case of the apparatus disclosed in the above-noted Stauffer applications, the angle of view of each of the optical arrangements forming the detection images is made to be the same as that of the other, and is desirably made to be relatively small, of the order of one to ten degrees. Also, these arrangements are so constructed and oriented with respect to the arrays 9 and 10 and the lens 1 that the image formed on the array 9 is substantially identical to the image formed on the array 10. In other words, each of these two detection images represents the same portion of the entire primary image which is formed on the plane 2 by the lens 1.

It is noted that it is not necessary that the two detection images be in focus on the corresponding arrays. All that is required is that each of these images has a distinguishable spatial radiation, or light, distribution on its corresponding array.

The FIG. 1 apparatus includes a novel portion which imparts a single pass scanning movement to the pivoted mirror 16. Specifically, the mirror 16 is provided with an arm 18 which terminates in a cam follower end 19. The latter is maintained in engagement with a cam or ramp surface 20 of a member 21 which is arranged to have vertical movement within guide means 22 between an upper limit position and a lower limit position. The position in which the member 21 is shown in FIG. 1 is an intermediate position lying between the said upper and lower limit positions.

When the member 21 is in its upper limit position, its upper end has the position shown in dashed lines. For this position of the member 21, the arm 18 causes the mirror 16 to occupy an extreme counter-clockwise position about the pivot 17. This position is the so-called near limit position of the mirror 16. When the member 21 is in its lower limit position, the arm 18 causes the mirror 16 to occupy an extreme clockwise position about the pivot 17. This position is the so-called far limit position of the mirror 16.

The basis for the terms near limit and far limit will be explained hereinafter. The position in which the mirror 16 is shown in FIG. 1 is an intermediate position lying between the said near limit and far limit mirror positions and corresponding to the illustrated intermediate position of the member 21.

Prior to the start of each automatic focusing operation, the member 21 occupies its upper limit position, and is held in that position by the plunger 23 of a deenergized solenoid 24. Specifically, the plunger 23 then engages a notch 25 in the member 21. The solenoid 24 has a winding 26, one end of which is connected through a switch 27 to the positive supply terminal 28 of a suitable power source, not shown. The negative terminal of this source is considered to be connected to ground, as is the remaining end of the winding 26.

As will be explained more fully hereinafter, the FIG. 1 apparatus is actuated, to start and perform a single automatic focusing operation, by the momentary closing of the switch 27. Such closure of the switch 27 energizes the solenoid 24 and causes the plunger 23 to retract. This allows a tension spring 29 to pull the member 21 down to its lower limit position. As the member 21 so moves downward, the cooperating follower end 19 and ramp surface 20 rotate the mirror 16 in the clockwise or scanning direction, shown by the arrow, from its near limit position. When the member 21 reaches its lower limit position, the mirror 16 occupies its far limit position.

Accordingly, as the released member 21 moves from its upper limit position to its lower limit position under the influence of the spring 29, a scanning period takes place in which the mirror 16 is rotated in the clockwise direction in a single scanning pass completely through its full range of positions from its near limit position to its far limit position. Subsequently, suitable restoring means, not shown, raise the member 21 to return it and the mirror 16 to their respective upper limit and near limit positions, wherein they are then held by the deenergized solenoid 24 until a subsequent actuation of the apparatus which again closes the switch 27.

In addition to the single pass scanning means as just described, the FIG. 1 apparatus includes a responsive portion which provides a measure of each position of the mirror 16 which represents an existing object distance. This portion includes operational amplifiers 30, 31, and 32, an RS flip-flop 33, and various other components which will be identified hereinafter.

The input of the amplifier 30 is connected to the chip 8 to receive the above-noted chip output signal. Specifically, the non-inverting input terminal 34 of the amplifier 30 is connected through a resistor 35 to the chip output connection 11. The latter is also connected through a resistor 36 to the inverting input terminal 37 of the amplifier 30. A capacitor 38 is connected between the input terminal 37 and ground.

The components which have just been described form a peak detector which causes the signal on the output terminal 39 of the amplifier 30 to switch from a negative to a positive value whenever the chip output signal experiences a negative peak or dip. Such a positive signal swing is produced, therefore, when the chip output signal experiences the above-noted correlation dip in the scanning period.

The output terminal 39 of the amplifier 30 is connected through a capacitor 40 and a resistor 41 to ground. The junction between the capacitor 40 and the resistor 41 is connected to the SET terminal 42 of the flip-flop 33. The cathode of a diode 43 is also connected to said junction, and the anode of that diode is connected to ground.

The operation of the chip 8 and the amplifier 30 is started and stopped by the respective closing and opening of a switch 44. To illustrate this, the switch 44 is shown as being connected between a positive power supply terminal 45 and a supply conductor 46 for the amplifier 30. Also, a supply conductor 47 is shown as being connected between the conductor 46 and the chip 8. The terminal 45 may be connected to the source to which the terminal 28 is connected. The switch 44 would be closed upon the actuation of the apparatus to perform an automatic focusing operation.

As will be explained more fully hereinafter, the construction just described causes the amplifier 30 to apply a positive set pulse of logic 1 to the flip-flop SET terminal 42 when the mirror 16 moves through the correlation position in a scanning period. Briefly, such a position of the mirror 16 causes the chip output signal on the connection 11 to dip to its minimum value, and this causes the signal on the amplifier output terminal 39 to swing positive. When this occurs, the RC circuit composed of the capacitor 40 and the resistor 41 produces the noted logic 1 pulse on the terminal 42.

The amplifier 31 is connected and utilized as an integrator. To this end, the non-inverting input terminal 48 of the amplifier 31 is connected through resistors 49 and 50 to a positive power supply terminal 51. The latter may be connected to the source to which the terminals 28 and 45 are connected. The inverting input terminal 52 of the amplifier 31 is connected to ground. An integrating capacitor 53 is connected between the output terminal 54 of the amplifier 31 and the non-inverting input terminal 48.

The junction between the resistors 49 and 50 is connected by a conductor 55 and a switch 56 to ground. The switch 56 is so arranged with respect to the member 21 that (a) the switch 56 is closed whenever the member 21 occupies its upper limit position, and (b) the switch 56 opens each time that the member 21 begins its downward or scanning travel. When the switch 56 is open, the signal at the output terminal 54 rises with time and hence with the movement of the mirror 16. When the switch 56 is closed, the signal on the output terminal 54 drops to zero. The signal on the terminal 54 is thus a ramp signal which follows and is proportional to the position of the mirror 16. The output terminal 54 is connected through an FET switch 57 to the non-inverting input terminal 58 of the amplifier 32. A memory capacitor 59 is connected between the terminal 58 and ground.

The amplifier 32 is connected as a voltage follower or isolating amplifier to prevent the unwanted discharge of the capacitor 59. To this end, the output terminal 60 of the amplifier 32 is connected to the inverting input terminal 61 of the latter.

The gate of the FET 57 is connected through a diode 62 to the Q output terminal 63 of the flip-flop 33. This construction is such that, when the flip-flop is reset and the output terminal 63 is at logic 0, the FET 57 is on, and the signal on the terminals 58 and 60 and on the capacitor 59 rises with the signal on the terminal 54 and thus follows the position of the mirror 16.

When the correlation dip in the chip output signal sets the flip-flop 33, a logic 1 appears on the Q terminal 63 which turns off the FET 57. The capacitor 59 then holds the signal on the terminals 58 and 60 to the value which it had at the instant that the correlation dip occurred. Consequently, the signal on the output terminal 60 is a so-called mirror position signal which represents the position of the mirror 16 in a given scanning period at which a correlation dip occurs. This signal also represents, therefore, the correlation position of the mirror and the existing object distance for the current scanning period.

The RESET terminal 64 of the flip-flop 33 is connected through a capacitor 65 to the above-noted junction to which the conductor 55 and the switch 56 are connected. As a result, the flip-flop 33 is reset each time that the switch 56 opens - that is, each time that a scanning period is started.

The lens 1 is slideably supported within guide means 66 for movement in an up-and-down direction as viewed in FIG. 1. In the latter figure, the lens 1 is shown in its uppermost position, which is its near limit position. In this position, the lens 1 is fully "out" or at its maximum distance from the plane 2. When the lens 1 occupies this near limit position, it produces a focused image on the plane 2 of an object which is at the minimum object distance that the apparatus is arranged to handle.

The lowermost position to which the lens 1 can be moved is a far limit or infinity position at which the lens 1 is fully "in" and at its minimum distance from the plane 2. When the lens 1 occupies its far limit position, it produces a focused image on the plane 2 for all object distances which are greater than a predetermined value, such as 30 feet.

In consonance with the foregoing, the aforementioned near limit position of the mirror 16 is its correlation position for the above-noted minimum object distance that the apparatus is arranged to handle. Similarly, the aforementioned far limit position of the mirror 16 is its correlation position when the object distance is equal to or greater than the above-assumed distance of thirty feet.

The control means for moving and positioning the lens 1 within its range of travel between its near limit and far limit positions include a tension spring 67 which is attached to a rack member 68 on the lens 1, and which urges the latter in a downward direction. The lens 1 is normally prevented from moving downward under the influence of the spring 67 by the extended plunger 69 of a solenoid 70 which engages the teeth of the rack member 68 when the solenoid 70 is deenergized. The solenoid 70 has a winding 71, one end of which is connected to ground. The other end of the winding 71 is connected to a conductor 72.

An operational amplifier 73 is arranged as a comparator to control the positioning of the lens 1 as necessary to make the lens position correspond to the correlation position of the mirror 16. To this end, the inverting input terminal 74 of the amplifier 73 is connected to the output terminal 60 of the amplifier 32 to receive the above-noted mirror position signal. The non-inverting input terminal 75 of the amplifier 73 is connected by a conductor 76 to a sliding contact 77 which engages a resistor 78. The contact 77 is mounted on the lens 1 so that the position of the contact 77 along the resistor 78 is a measure of the lens position. One end of the resistor 78 is connected to a positive supply terminal 79, and the other end of the resistor 78 is connected to ground. The terminal 79 may be connected to the source to which the terminals 28, etc., are connected. The output terminal 80 of the amplifier 73 is connected to the cathode of a diode 81, the anode of which is connected to the conductor 72 through a switch 82.

As a result of the above-described connections, a lens position signal is applied to the input terminal 75 for comparison to the mirror position signal which is applied to the input terminal 74. As long as the mirror position signal on the terminal 74 is greater than the lens position signal on the terminal 75, the comparator output signal on the terminal 80 is negative, the solenoid 70 is energized, the plunger 69 is retracted, and the lens 1 is permitted to move downward under the urging of the spring 67. Whenever the lens 1 reaches a position at which the lens position signal catches-up to the mirror position signal, the output signal on the terminal 80 switches to a positive value, the solenoid 70 is deenergized, and the plunger 69 arrests the movement of the lens 1. The latter is then held at a position corresponding to the held value of the mirror position signal, and hence corresponding to the correlation position of the mirror and the existing object distance for the current scanning period.

The over-all operation of the above-described FIG. 1 apparatus will be described below, following the description of the FIG. 2 apparatus now to be provided.

The Apparatus of FIG. 2

As previously noted, FIG. 2 illustrates one form which the circuit of the chip 8 of the FIG. 1 apparatus may take. This illustrated form of circuit is the equivalent of that illustrated in the the above-noted Stauffer application (1), and includes the above-noted light responsive elements and signal processing circuitry.

In FIG. 2, the above-noted light responsive elements are shown as photodiodes 101 through 104'. The photodiodes 101 through 104 are included in the first detector array 9, and the photodiodes 101' through 104' are included in the second detector array 10. The showing of four photodiodes as forming each of the detector arrays 9 and 10 has been made for illustrative purposes, and it is to be understood that each array could include any desired number of any desired form of light responsive elements.

The anodes of the photodiodes are connected to the chip supply conductor 47. The cathode of each of the photodiodes 101 through 104 is connected to one of the inputs of a corresponding one of four differential amplifiers 105 through 108. The cathode of each of the photodiodes 101' through 104' is connected to the remaining input of a corresponding one of the amplifiers 105 through 108. Specifically, the photodiodes 101 and 101' are connected to respective inputs of the amplifier 105, the photodiodes 102 and 102' are connected to respective inputs of the amplifier 106, the photodiodes 103 and 103' are connected to respective inputs of the amplifier 107, and the photodiodes 104 and 104' are connected to respective inputs of the amplifier 108. The common terminals of the amplifiers 105 through 108 are connected to ground.

As a result of the connections just described, the photodiodes of the array 9 are connected in pairs with the positionally-corresponding photodiodes of the array 10, with each diode pair being connected to the inputs of a corresponding one of the amplifiers 105 through 108.

A respective one of diodes 109 through 116 is connected between each of the amplifier inputs and ground to cause the photodiode output signals as supplied to the amplifier inputs to represent the logs of the light intensities on the corresponding photodiodes. This is done to make the output signals of the amplifiers 105 through 108 essentially independent, within wide limits, of the absolute level of the light of the detection images falling on the arrays 9 and 10.

The output of each of the amplifiers 105 through 108 is connected across the input of a corresponding one of amplifiers 117 through 120. The output of each of the amplifiers 117 through 120 is connected to a common point 121 through the anode-cathode path of a respective one of diodes 122 through 125. Also, the output of each of the amplifiers 117 through 120 is connected to a common point 126 through the cathode-anode path of a respective one of diodes 127 through 130.

The point 126 is connected to one input of an amplifier 131, the other input of which is connected to ground. The output of the amplifier 131 is connected through a resistor 132 to one input of an amplifier 133, to which input the point 121 is also connected. The other input of the amplifier 133 is connected to ground. The output of the amplifier 133 is connected to the output connection 11. A feedback resistor 134 is connected between the output and the ungrounded input of the amplifier 131, and a feedback resistor 135 is connected between the output and the ungrounded input of the amplifier 133. A voltage clamping diode 136 is connected between the connection 11 and the negative supply terminal 137 of a suitable power source, not shown. The positive terminal of this source is considered to be connected to ground.

In a manner which is explained in detail in the above-noted Stauffer application (1), the construction of the chip 8 as just described causes the output signal of each of the amplifiers 105 through 108 to be a resultant signal which represents the ratio of the intensities of the light falling on the photodiodes of the pair of photodiodes which is connected to that amplifier. These resultant signals are made positive, as necessary, and the four positive signals are summed to form the output signal between the connection 11 and ground. Each of these resultant signals attains a minimum value when the two photodiodes which produce it are most similarly illuminated. Consequently, the chip output signal on the connection 11 dips to a minimum value when there is best correspondence between the light distributions of the two detection images on the arrays 9 and 10. The diode 136 prevents minor or false dips from appearing in the chip output signal.

Operation of the Apparatus of FIG. 1

In connection with the following description of the operation of the FIG. 1 apparatus, it is desirable that the following criteria be kept in mind:

1. For any given position of the mirror 16, the two images formed on the respective arrays 9 and 10 move apart as the object distance decreases, and move together as the object distance increases. Accordingly, the greater or longer the object distance, the further the image on the array 9 will be toward the right.

2. As the mirror 16 is rotated or scanned progressively clockwise from its near limit position to its fully clockwise or far limit position, the image formed on the array 10 moves correspondingly toward the right.

3. As the mirror 16 is rotated progressively clockwise during its scanning travel, it reaches, and passes through, a position at which the light distribution of the image on the array 10 best corresponds to the light distribution of the image on the array 9. This is the correlation position of the mirror 16 for the existing object distance, and this particular position thus represents this particular object distance. The attainment of this best light distribution correspondence and correlation position is manifested by a dip to a minimum value in the chip output signal on the connection 11.

4. The greater the object distance from its minimum value, the further the mirror 16 will have been rotated in its scanning period at the time at which it temporarily occupies the correlation position for the existing object distance and causes the chip output signal to experience the correlation dip for that period.

The manner in which the FIG. 1 apparatus operates will be described by reference to its operation for a typical situation, which is illustrated by the curves 138 through 145 of the operational curve diagram of FIG. 3. Specifically, the description which follows is that of the automatic focusing operation which typically takes place as the aforementioned camera which includes the FIG. 1 apparatus operates to make a typical photograph of an object. For illustrative purposes, it is assumed that the distance to said object is of the order of twenty feet, that the automatic focusing action is the first phase of the camera operation, and that this operation and action are started by an operator's actuation of an appropriate control on the camera which closes the switches 27 and 44 at a time T1. This time, as well as others occurring during the described automatic focusing operation, are designated on the curves of FIG. 3.

The curves of FIG. 3 show the variations in the position of the mirror 16, and in certain of the signals produced in the FIG. 1 apparatus, which take place during the single scanning period of the typical operation being considered. Specifically, the curves 138 through 145 show the variation of the following items with respect to time:

| CURVE | ITEM |
|---|---|
| 138 | position of mirror 16; signal on terminal 54 |
| 139 | chip output signal on connection 11 |
| 140 | set signal on terminal 42 |
| 141 | conductivity of FET 57 |
| 142 | mirror position signal on terminal 74 |
| 143 | lens position signal on terminal 75 |
| 144 | output signal on terminal 80 |
| 145 | energization of solenoid 70. |

Just prior to the time T1 at which the automatic focusing operation is started, the switch 27 is open, whereby the solenoid 24 is deenergized and causes the plunger 23 to hold the member 21 up in its upper limit position. Consequently, the mirror 16 occupies its near limit position as shown by the curve 138. Also, the switch 56 is held closed, and the ramp signal on the terminal 54 of the integrating amplifier 31 is zero, as is also shown by the curve 138. The switch 44 is open, whereby the chip output signal on the connection 11 and the set signal on the terminal 42 are zero as shown by the respective curves 139 and 140.

Also just prior to the time T1, the lends 1 is in its illustrated near limit position, whereby the lens position signal on the terminal 75 is zero as shown by the curve 143. The switch 82 is open, whereby the solenoid 70 is deenergized as shown by the curve 145. Consequently, the plunger 69 is in engagement with the member 68 and holds the lens 1 in the illustrated position.

At the time T1 at which the operator actuates the camera control to start the single pass automatic focusing operation, such actuation closes the switches 27 and 44. The closure of the switch 44 powers the chip 8 and the amplifier 30. Consequently, the chip output signal on the connection 11 rises to some initial value at the time T1 as shown by the curve 139. This value is determined by the clamping diode 136.

The closure of the switch 27 energizes the solenoid 24 to start the downward movement of the member 21 and the clockwise, scanning rotation of the mirror 16 at the time T1. Accordingly, the mirror 16 proceeds with its scanning movement following the time T1 as shown by the curve 138. The downward movement of the member 21 causes the switch 56 to open at the time T1. As a result, the ramp signal on the terminal 54 rises from the time T1, following and proportional to the mirror position, as shown by the curve 138.

The opening of the switch 56 at the time T1 also resets the flip-flop 33 by way of the capacitor 65. This causes a logic 0 to appear on the flip-flop Q output terminal 63 which turns on the FET 57 as shown by the curve 141.

The FET 57 thus now couples the ramp signal terminal 54 to the terminal 58. This causes the mirror position signal on the terminals 58 and 74 to be reset to zero from whatever previous value it may have had, and then to start to rise at the time T1, following the ramp signal. This is shown by the curve 142.

It is assumed that the switch 82 has not as yet been closed. As a result, there is no energization of the solenoid 70 or downward movement of the lens 1 at the time T1, as shown by the curve 145. Consequently, the lens position signal on the terminal 75 does not change at this time, but remains at zero as shown by the curve 143.

The comparator output signal on the terminal 80 goes to zero momentarily at the time T1 as the FET 57 turns on, and then rapidly goes to its negative value as the mirror position signal on the terminal 74 starts to rise. This is shown by the curve 144. This signal on the terminal 80 has no effect on the solenoid 70, however, because of the open condition of the switch 82.

It is assumed that the camera mechanism causes the switch 82 to close at a time T2. At that time, therefore, the negative signal on the terminal 80 effects the energization of the solenoid 70 as shown by the curve 145. This causes the withdrawal of the plunger 69, allowing the spring 67 to start moving the lens 1 downward. As a result, the lens position signal on the terminal 75 starts to rise at the time T2 as shown by the curve 143. Since the mirror position signal on the terminal 74 is ahead of the lens position signal on the terminal 75, the rising lens position signal does not change the negative output signal on the terminal 80 or the energization of the solenoid 70.

The mirror 16 continues to rotate, the mirror position signal continues to rise, the solenoid 70 remains energized, the lens 1 continues to move, and the lens position signal continues to rise until the rotation of the mirror 16 brings the latter into a position at which the chip output signal experiences the correlation dip which drops this signal below the clamping level. This is shown by the curve 139 as occurring at a time T3. This time T3 is actually the time at which the chip output signal on the amplifier input terminal 34 has just slightly passed its lowest value and has started upward, whereby the signal on the output terminal 39 has just swung positive. This causes the following events to occur at the time T3:

1. A logic 1 set pulse is applied to the flip-flop terminal 42 as shown by the curve 140;
2. The flip-flop 33 is set and produces a logic 1 on its Q output terminal 63 which turns off the FET 57 as shown by the curve 141;
3. The mirror position signal on the terminal 74 stops rising, and is held by the capacitor 59 at a value representative of the position of the mirror 16 at which the chip output signal dip occurred; and
4. The energization of the solenoid 70 and the downward movement of the lens 1 continue, it being assumed that the rising lens position signal on the terminal 75 has not as yet caught up to the now held mirror position signal on the terminal 74, due to the inertia of the lens structure.

Notwithstanding the detection of the chip output signal peak at the time T3, and the holding of the mirror position signal at a corresponding value, the scanning rotation of the mirror 16 and the downward movement of the lens 1 continue. At a time T4 subsequent to the time T3, the downward movement of the lens 1 which has been continuing causes the lens position signal to catch up to, and just predominate over, the held mirror position signal. At this time T4, therefore, the output signal on the terminal 80 rapidly shifts to a positive value as shown by the curve 144. This terminates the energization of the solenoid 70 as shown by the curve 145, whereby the plunger 69 is released and arrests the downward movement of the lens 1. Consequently, the solenoid 70 now holds the lens 1 in a position corresponding to the position of the mirror 16 at which the time T3 dip occurred. Since this mirror position at the time T3 was the correlation position, the corresponding arrested position of the lens 1 is the proper focus position for the existing object distance, as is desired.

At the completion of the scanning period at the time T5, the camera mechanism may well be automatically actuated to photograph the in-focus image provided by the properly positioned lens 1. Subsequently, the lens 1 is returned to its near limit position by suitable means, not shown. Also, the member 21 is returned to its upper limit position, and the switches 21, 44, and 82 are opened, awaiting the next actuation of the apparatus to initiate the next automatic focusing operation and scanning period.

In the typical operation of the FIG. 1 apparatus described above, it was assumed that the switch 82 was closed early in the scanning period. It is noted, however, that the closure of the switch 82 could be made at any suitable time in the scanning period. It is also noted that the lens 1 could, in practice, move at different rates than that assumed for the foregoing description. It should be clear also that the typical operation which has been described applies as well for object distances other than the assumed object distance of the order of twenty feet.

It is noted that means other than the illustrated integrating amplifier 31 and its associated components could be used to produce the ramp signal which is supplied to the terminal 58 by way of the FET 57. For example, the ramp signal could be produced by a photosensitive device which receives progressively more light as the member 21 moves progressively downward, or by a variable resistance device whose resistance is changed progressively by the progressive downward movement of the member 21. If even greater accuracy is desired, the photosensitive device or the resistance device could be actuated directly by the mirror 16 in proportion to its position in the scanning period.

It is believed to be clear from the foregoing description that the described apparatus according to the present invention fulfills the objects stated herein. Thus, it has been shown that the apparatus effects the proper positioning of the lens 1 in an automatic focusing operation simply by moving the mirror 16 in a single scanning pass completely through its full range of positions relative to the array 10. Since the mirror 16 need be so moved only once for each automatic positioning of the lens 1, the scanning means for moving the mirror 16 can be, and is, of a desirably simple construction.

Also, the lens 1 and the mirror 16 of the illustrated apparatus are independently movable with respect to each other, whereby the lens 1 places no limitation on the speed with which the mirror 16 moves. Consequently, this scanning speed can be made to be as high as is needed to minimize errors arising from camera and/or subject motion. It has been determined in practice that a satisfactory degree of such minimization is achieved by making the duration of the single scanning period of the order of fifty milliseconds.

The absence of any mechanical connection between the mirror 16 and the lens 1 also eliminates all restrictions which such a connection would otherwise impose as to the relative placement and location of the mirror and lens in the apparatus. This mechanical independence between the mirror and lens also facilitates the use of interchangeable lenses, since, with the illustrated construction, each such interchangeable lens need only be equipped with a suitably characterized and matched one of the resistors 78 in order to be properly positioned by the apparatus in accordance with the mirror position signal.

The embodiments of the invention in which an exclusive property or privilege is claimed are defined as follows:

1. In apparatus for adjusting an adjustable element into a position representative of the distance between the apparatus and an object, wherein said position is represented by the position of a moved optical means when radiation it receives from the object and transmits it to radiation responsive means produces a signal peak, the improvement comprising scanning means for moving said optical means, independently of said adjustable element, in a single scanning pass completely through its full range of positions, only once upon each actuation of said apparatus, to identify and provide a measure of said position of said optical means when said signal peak is produced, the scanning movement of said optical means being arrested at the completion of said single pass until said apparatus is subsequently actuated again to initiate a subsequent scanning pass, and control means responsive to said measure and coupled to said adjustable element to move the latter, independently of said optical means, into a position corresponding to said identified position of said optical means.

2. Apparatus for providing a measure of the distance between the apparatus and an object only once upon each actuation of the apparatus, comprising radiation responsive means, movable optical means for receiving radiation from said object and transmitting it to said radiation responsive means, an adjustable element, scanning means for relatively moving at least a portion of said optical means and said radiation responsive means, independently of said element, completely through a full range of relative positions in a single scanning pass only once upon each actuation of said apparatus, said relative movement of said scanning pass being arrested at the completion of said single pass until said apparatus is subsequently actuated again to initiate a subsequent scanning pass, thereby to provide only a single scanning period upon each such actuation, signal processing means connected to said radiation responsive means to produce a signal which peaks in a given direction at a one of said positions which is unique for the existing object distance, responsive means including peak detecting means connected to receive said signal and to respond to said relative movement for producing an effect which represents the one of said positions at which said peak is produced in said period, and control means responsive to said effect and coupled to said element for adjusting the latter into a position corresponding to said represented position, the adjusted position of said element thus being a measure of the existing object distance.

3. Apparatus for providing a measure of the distance between the apparatus and an object only once upon each actuation of the apparatus, comprising radiation responsive means, an adjustable element, a movable optical means, movable independently of said element, for receiving radiation from said object so as to image said object on said radiation responsive means, scanning means for moving said optical means, independently of said element, completely through its full range of positions in a single scanning pass only once upon each actuation of said apparatus, the scanning movement of said optical means being arrested at the completion of said single pass until said apparatus is subsequently actuated again to initiate a subsequent scanning pass, thereby to provide only a single scanning period upon each such actuation, signal processing means connected to said radiation responsive means to produce a signal which peaks in a given direction at a one of said positions of said optical means which is unique for the existing object distance, responsive means including peak detecting means connected to receive said signal and to respond to said movement of said optical means for producing an effect which represents said one of said positions of said optical means at which said peak is produced in said period, and control means responsive to said effect and coupled to said element for adjusting the latter, independently of said optical means, into a position corresponding to said represented position of said optical means, the adjusted position of said element thus being a measure of the existing object distance.

4. Apparatus as specified in claim 3, wherein said responsive means include first means for providing a ramp signal of a value which changes in synchronism with said scanning movement of said optical means such that, at any time in said period, the value of said ramp signal represents the concurrent one of said positions of said optical means, and second means connected to said first means to receive said ramp signal, and responsive to said peak detecting means, for providing said effect as an output signal of a value which represents the value had by said ramp signal at the time of the occurrence of said peak in said period, and wherein said control means are responsive to the value of said output signal for making the position of said element correspond to the last-mentioned value.

5. Apparatus as specified in claim 4, wherein said control means include element position responsive means coupled to said element for providing an element position signal of a value which represents the concurrent position of said element, comparator means connected to receive and to compare the values of said output signal and said element position signal, and motive means coupled to said element and responsive to said comparator means to make the position of said element that in which the value of said element position signal corresponds to the value of said output signal.

6. Apparatus for providing a measure of the distance between the apparatus and an object only once upon each acutation of the apparatus, comprising a plurality of radiation responsive elements in two detector arrays, each of said elements providing a signal representative of the intensity of radiation impinging thereon, first auxiliary means defining a first optical path for radiation from the object and for forming a first detection image thereof on one of said arrays, second auxiliary means defining a second optical path for radiation from the object and for forming a second detection image thereof on the other of said arrays, the radiation distributions of said detection images changing with changes in the relative positions of said auxiliary means and said arrays, and with changes in the object distance, there being for each such distance a one of the last-mentioned positions at which there is best correspondence of said distributions on said arrays, an adjustable member, scanning means for moving at least a portion of at least one of said auxiliary means, independently of said member, progressively through a full range of positions in a single scanning pass only once upon each actuation of said apparatus, the scanning movement of said moved portion being arrested at the completion of said single pass until said apparatus is subsequently actuated again to initiate a subsequent scanning pass, thereby to provide only a single scanning period upon each such actuation, and said range including said one position at which there is said best correspondence of said distributions on said arrays for the existing object distance, signal processing means connected to said elements for comparing the signal from each of said elements of one of said arrays with the signal from a positionally corresponding one of said elements of the other of said arrays, and for using the results of such comparisons to provide a first signal which experiences a major excursion in a given direction when said best correspondence of said distributions on said arrays is obtained, peak detecting means connected to receive said first signal for producing a predetermined control effect upon the occurrence of said excursion in said first signal in said period, responsive means coupled to said peak detecting means and responsive to said control effect and to said movement of said moved portion to effectively identify the one of said positions in said range at which said control effect is produced in said period, thereby to identify said one position of said moved portion at which said best correspondence is obtained, and control means coupled to said responsive means and to said member for adjusting the latter, independently of said auxiliary means, into a position corresponding to said identified position of said moved portion, the adjusted position of said member thus being a measure of the existing object distance.

7. In apparatus for moving an optical element to the position in which it produces, on a given plane, a focused image of an object, wherein said position is represented by the position of a moved optical means when radiation it receives from the object and transmits to radiation responsive means produces a signal peak, the improvement comprising scanning means for moving said optical means, independently of said optical element, in a single scanning pass completely through its full range of positions, only once upon each actuation of said apparatus, to identify and provide a measure of said position of said optical means when said signal peak is produced, the scanning movement of said optical means being arrested at the completion of said single pass until said apparatus is subsequently actuated again to initiate a subsequent scanning pass, and control means responsive to said measure and coupled to said optical element to move the latter, independently of said optical means, into a position corresponding to said identified position of said optical means.

8. In apparatus for moving a lens to the position at which it produces, on a given plane, a focused image of an object, wherein said position corresponds to the position of a mirror, which receives light from the object and transmits it to a light responsive element during a scanning period, when the signal from light responsive element reaches a peak, the improvement comprising scanning means for moving said mirror, independently of said lens, in a single scanning pass completely through its full range of positions, only once for each actuation of said apparatus, to identify and provide a measure of said mirror position at which said peak is obtained, the scanning movement of said mirror being arrested at the completion of said single pass until said apparatus is subsequently actuated again to initiate a subsequent scanning pass, and control means responsive to said measure of said mirror position and coupled to said lens to move the latter, independently of said mirror, into a position corresponding to said identified position of said mirror.

9. Automatic focusing apparatus for automatically bringing an image of an object into focus on a predetermined plane for the existing object distance only once upon each actuation of the apparatus, comprising radiation responsive means, optical means for imaging said object on said radiation responsive means, a positionable optical element for producing an image of said object on said plane, scanning means for relatively moving at least a portion of said optical means and said radiation responsive means, independently of said element, completely through a full range of relative positions in a single scanning pass only once upon each actuation of said apparatus, said relative movement of said scanning pass being arrested at the completion of said single pass until said apparatus is subsequently actuated again to initiate a subsequent scanning pass, thereby to provide only a single scanning period upon each such actuation, signal processing means connected to said radiation responsive means to produce a signal which peaks in a given direction at a one of said positions which is unique for the existing object distance, responsive means including peak detecting means connected to receive said signal and to respond to said relative movement for producing an effect which represents the one of said positions at which said peak is produced in said period, and control means responsive to said effect and coupled to said element for adjusting the latter into a position corresponding to said represented position, the adjusted position of said element thus being a measure of the existing object distance and causing said image to be in focus on said plane.

10. Automatic focusing apparatus for automatically bringing an image of an object into focus on a predetermined plane for the existing object distance only once upon each actuation of the apparatus, comprising radiation responsive means, a positionable optical element for producing an image of said object on said plane, a movable optical means, movable independently of said optical element, for imaging said object on said radiation responsive means, scanning means for moving said optical means, independently of said optical element, completely through its full range of positions in a single scanning pass only once upon each actuation of said apparatus, the scanning movement of said optical means being arrested at the completion of said single pass until said apparatus is subsequently actuated again to intiate a subsequent scanning pass, thereby to provide only a single scanning period upon each such actuation, signal processing means connected to said radiation responsive means to produce a signal which peaks in a given direction at a one of said positions of said optical means which is unique for the existing object distance, responsive means including peak detecting means connected to receive said signal and to respond to said movement of said optical means for producing an effect which represents said one of said positions of said optical means at which said peak is produced in said period, and control means responsive to said effect and coupled to said optical element for adjusting the latter, independently of said optical means, into a position corresponding to said represented position of said optical means, the adjusted position of said optical element thus being a measure of the existing object distance and causing said image to be in focus on said plane.

11. Apparatus as specified in claim 10, wherein said responsive means include first means for providing a ramp signal of a value which changes in synchronism with said scanning movement of said optical means such that, at any time in said period, the value of said ramp signal represents the concurrent one of said positions of said optical means, and second means connected to said first means to receive said ramp signal, and responsive to said peak detecting means, for providing said effect as an output signal of a value which represents the value had by said ramp signal at the time of the occurrence of said peak in said period, and wherein said control means are responsive to the value of said output signal for making the position of said element correspond to the last-mentioned value.

12. Apparatus as specified in claim 11, wherein said control means include element position responsive means coupled to said element for providing an element position signal of a value which represents the concurrent position of said element, comparator means connected to receive and to compare the values of said output signal and said element position signal, and motive means coupled to said element and responsive to said comparator means to make the position of said element that in which the value of said element position signal corresponds to the value of said output signal.

13. Automatic focusing apparatus for automatically bringing an image of an object into focus on a predetermined plane for the existing object distance only once upon each actuation of the apparatus, comprising a plurality of radiation responsive elements in two detector arrays, each of said elements providing a signal representative of the intensity of radiation impinging thereon, first auxiliary means defining a first optical path for radiation from the object and for forming a first detection image thereof on one of said arrays, second auxiliary means defining a second optical path for radiation from the object and for forming a second detection image thereof on the other of said arrays, the radiation distributions of said detection images changing with changes in the relative positions of said auxiliary means and said arrays, and with changes in the object distance, there being for each such distance a one of the last-mentioned positions at which there is best correspondence of said distributions on said arrays, a positionable optical member for producing an image of said object on said plane, scanning means for moving at least a portion of at least one of said auxiliary means, independently of said member, progressively through a full range of positions in a single scanning pass only once upon each actuation of said apparatus, the scanning movement of said moved portion being arrested at the completion of said single pass until said apparatus is subsequently actuated again to initiate a subsequent scanning pass, thereby to provide only a single scanning period upon each such actuation, and said range including said one position at which there is said best correspondence of said distributions on said arrays for the existing object distance, signal processing means connected to said elements for comparing the signal from each of said elements of one of said arrays with the signal from a positionally corresponding one of said elements of the other of said arrays, and for using the results of such comparisons to provide a first signal which experiences a major excursion in a given direction when said best correspondence of said distributions on said arrays is obtained, peak detecting means connected to receive said first signal for producing a predetermined control effect upon the occurrence of said excursion in said first signal in said period, responsive means coupled to said peak detecting means and responsive to said control effect and to said movement of said moved portion to effectively identify the one of said positions in said range at which said control effect is produced in said period, thereby to identify said one position of said moved portion at which said best correspondence is obtained, and control means coupled to said responsive means and to said member for adjusting the latter, independently of said auxiliary means, into a position corresponding to said identified position of said moved portion, the adjusted position of said member thus being a measure of the existing object distance and causing said image to be in focus on said plane.

14. Apparatus for automatically moving a lens from a datum position to a position of focus for an object at its existing object distance only once upon each actuation of the apparatus, comprising radiation responsive means, a mirror movable independently of said lens for imaging said object on said radiation responsive means, said mirror having a near limit position corresponding to a minimum object distance, and having a far limit position corresponding to an infinite object distance, scanning means including a first releasable single pass motive means for moving said mirror from said near limit position and through a range of intermediate positions to said far limit position in a single scanning pass throughout a single scanning period once upon each release of said motive means, signal processing means connected to said radiation responsive means to produce a signal which peaks in a given direction at a one of said positions of said mirror which is unique for the existing object distance, responsive means including peak detecting means connected to receive said signal and to respond to said movement of said mirror for providing a mirror position signal of a value which represents said one position of said mirror, first releasing means operable when actuated to release said first motive means, thereby to initiate said single scanning pass and said single scanning period and to establish said value of said mirror position signal, control means responsive to said mirror position signal and including a second releasable single pass motive means coupled to said lens for adjusting the latter, independently of said mirror, from said datum position to a position corresponding to the value of said mirror position signal once upon the release of said second motive means, and second releasing means included in said control means and operated thereby to release said second motive means once for each release of said first motive means, the adjusted position of said optical element thus being a measure of the existing object distance and causing said image to be in focus on said plane.

15. Apparatus as specified in claim 14, wherein said first signal pass motive means is a spring.

* * * * *